Oct. 5, 1965    K. SALNA    3,209,475
EARTH SCRAPER
Filed April 5, 1962    2 Sheets-Sheet 1

INVENTOR.
Karl Salna
BY
Paul O. Pippel
Atty.

Oct. 5, 1965 K. SALNA 3,209,475
EARTH SCRAPER
Filed April 5, 1962 2 Sheets-Sheet 2

INVENTOR.
Karl Salna
Paul O. Pippel
Atty.

3,209,475
EARTH SCRAPER
Karl Salna, Mundelein, Ill., assignor to The Frank G. Hough Co., a corporation of Illinois
Filed Apr. 5, 1962, Ser. No. 185,399
5 Claims. (Cl. 37—117.5)

This invention relates generally to earth scrapers, and more particularly to a novel multiple blade and bucket construction for an earth scraper.

The primary object of the present invention is to provide a novel earth scraper and bucket arrangement.

It is another object to provide a novel construction of two earth scraping blades in an arrangement where the earth scraping blades can be used singly or simultaneously in earth scraping operations.

It is a further object to provide a novel stabilizing support in an earth scraping blade arrangement which will permit a relatively smooth and flat cut irrespective of any oscillating movements of the tractor carrying the arrangement.

It is another object to provide a novel bucket arrangement in an earth scraper according to the preceding paragraphs which will be filled with earth contemporaneously with the cutting and scraping thereof.

It is still another object to provide a novel prying tool arrangement in an earth scraper according to the preceding paragraphs which will permit large objects such as rocks to be pried from the earth without imparting any substantial load to the tractor which carries the scraper.

Other objects and features of the invention will be apparent upon a perusal of the following specification and drawings in which.

The present embodiment is the preferred embodiment but it is to be understood that changes can be made in the present embodiment by one skilled in the art without departing from the spirit and scope of the present invention.

Generally, the present invention comprises a U-shaped scraper frame with the leg or push beam portions of the frame pivotally connected to the tractor and with a cross piece of the frame extending transversely and forwardly of the tractor. A hydraulic ram is pivotally connected between the tractor and the cross piece of the frame for raising and lowering the forward end of the frame. An earth scraping blade arrangement is pivotally connected to the forward end of the frame to extend transversely of the tractor. A pair of hydraulic rams are connected between the scraper blade and the frame for adjusting the pitch of the scraper blade relative to the ground.

The second scraper blade is provided with rearwardly extending side plates which are pivotally connected at the upper rearward ends thereof to the upper side walls of the first scraper blade. The second scraper blade is further provided with a curved plate which extends from the upper rearward side of the blade to a position spaced forwardly of the lower rearward end of the side walls so that a bucket is defined when the second scraper blade is downwardly pivoted to engage the first scraper blade. The upper side of the defined bucket arrangement is open. The underside of the second scraper blade is further provided with a plate which extends from the lower end of the cutting edge thereof to the rearward end of the curved plate. The pivotal position of the second scraper blade relative to the first scraper blade is controlled by a pair of hydraulic rams which are pivotally connected between the frame and the side walls of the second scraper blade.

Figure 3:
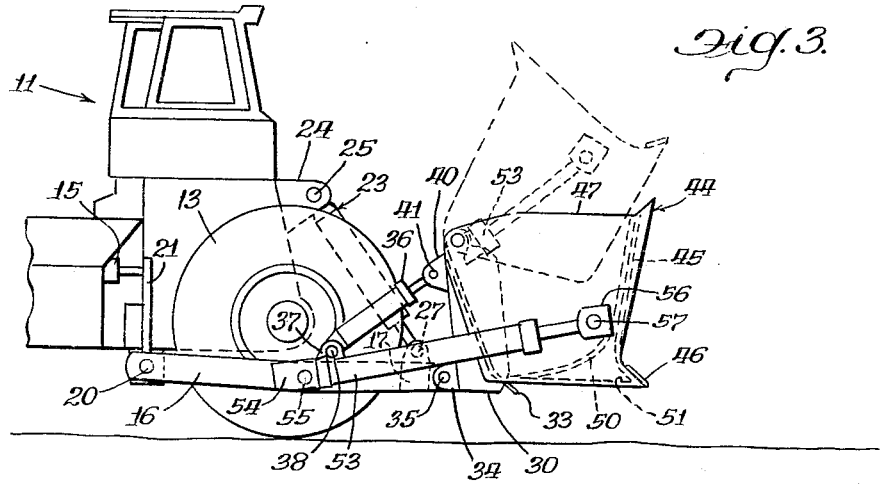
FIGURE 3 is a partial view of the structure shown in FIGURE 1 with the invention in an earth carrying position.

In the operation of the invention as a conventional single blade earth scraper, the second or forward scraper blade is pivoted upwardly to a position such as shown by the dotted lines in FIGURE 3. The first scraper blade may then be lowered to ground level by operating the hydraulic ram which is connected between the tractor and the frame. By proper adjustment of the hydraulic rams connected between the frame and the first scraper blade, the desired pitch of the cutting edge may easily be selected.

The second scraper blade can also be used to cut and scrape the earth by pivoting the second scraper blade to engage the first in a position such as shown by the solid lines in FIGURE 3, and by then lowering the frame and adjusting the pitch hydraulic rams to place the second scraper blade in the desired scraping position relative to the earth.

Figure 1:
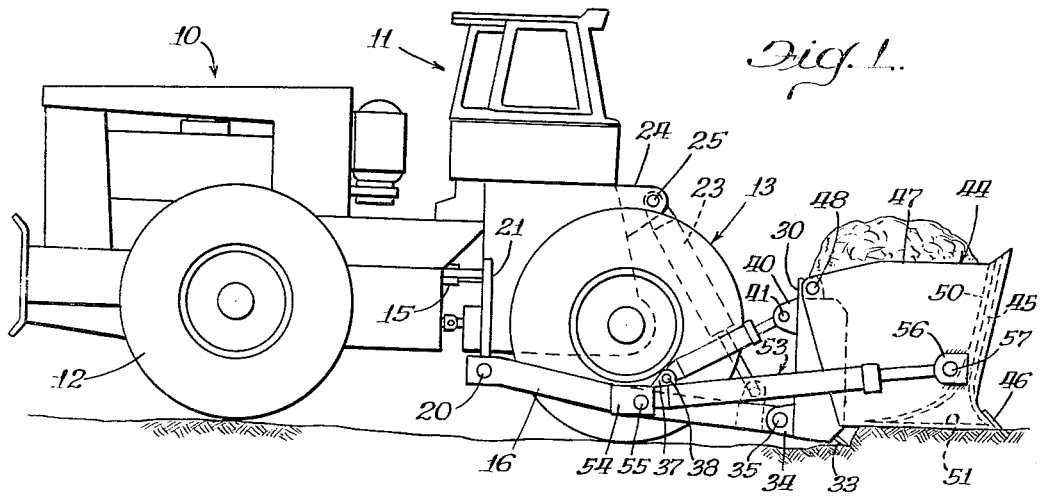
FIGURE 1 is a side elevational view of the invention carried on an articulated tractor.

If the first and second scraper blades are positioned relative to each other and relative to the ground such as shown in FIGURE 1, the underside of the second blade will function as a stabilizer member as the first scraper blade scrapes a certain layer of earth into the bucket area defined by the first and second scraper blades. The advantages of this scraping arrangement are substantial when consideration is given to normal tractor oscillation caused by deflection of the tires of a rubber tired tractor. The scraper blade, depending on ground or earth conditions, is more or less sucked into the earth by the action of the blade in cutting. Without the stabilizing arrangement of the forward or second scraper blade, the operator would be required to constantly adjust the bite of the blade which would result in a rather rough finished cut. With the stabilizing arrangement of the invention, the first or rearward scraper blade is substantially supported by the second or forward scraper blade, and the forward blade can be adjusted to produce deeper or shallower cuts of the rearward scraper blade. This arrangement will produce a finished cut of the earth which is smooth and flat.

Figure 4:
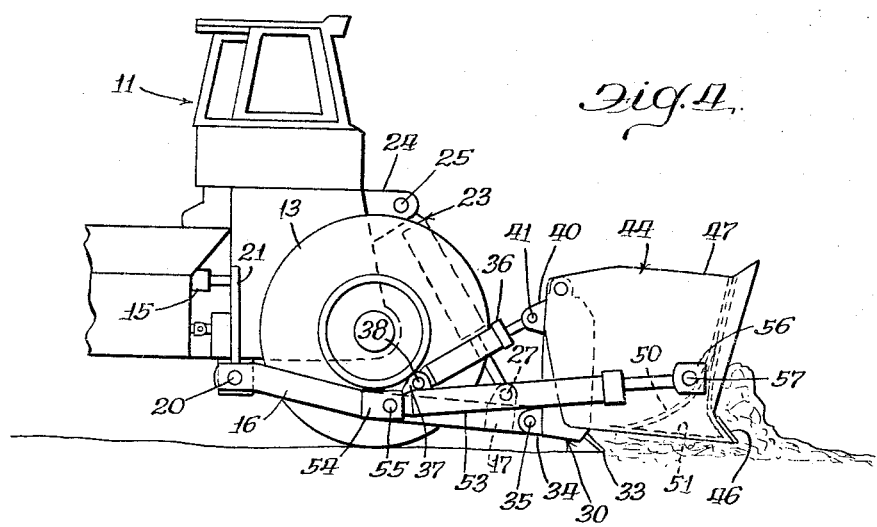
FIGURE 4 is a view similar to FIGURE 3 but showing both scraper blades simultaneously scraping the earth in two layers.

FIGURE 4 shows the simultaneous use of both the forward and rearward scraper blades in a scraping operation. This arrangement provides for two different scraping operations with a single pass of the tractor. Such an arrangement is advantageous in pioneering work when for example it is desired to scrape a layer of top soil after first skimming off debris or brush. In this arrangement the forward blade is adjusted to a relatively shallow cut with the rearward blade being adjusted to a deeper cut.

Figure 5:
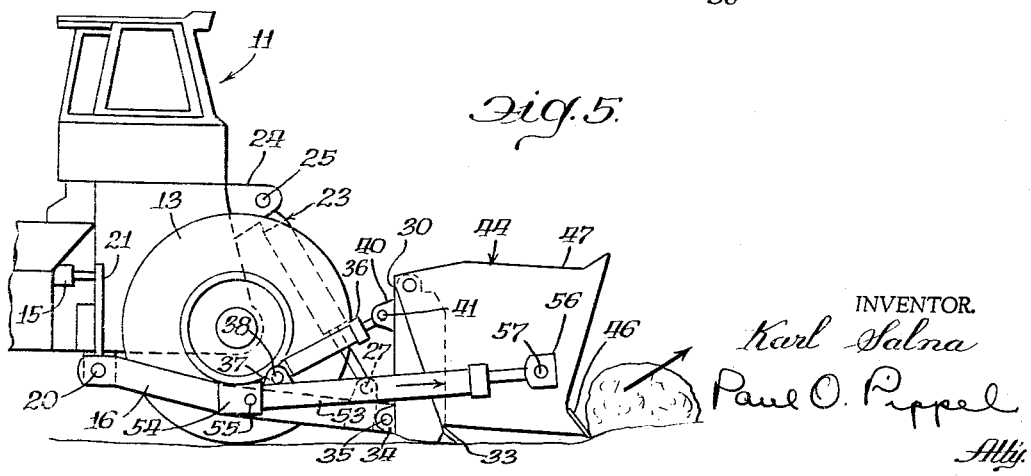
FIGURE 5 is a view similar to FIGURES 3 and 4 but showing the operation of the invention as a prying or break-out tool.

FIGURE 5 shows the use of the invention in prying out a large rock or boulder. In this operation of the invention, the frame is lowered to place the underside of the first scraper blade on the ground so that the first scraper blade can take any reaction loads produced by the upward pivoting of the second or forward scraper blade against a rock. In this operation of the invention substantially no loading will be imposed upon the tractor itself. With the rearward scraper blade securely resting upon the ground, the extension of the hydraulic rams connected to the forward scraper blade can develop forces which exceed the weight of the tractor and which further will be independent of the tractive effort developed by the tractor.

A further important feature of the invention is the ability of the invention to carry rather than push or roll a load of earth to a remote position. In either the arrangement of FIGURE 1 or FIGURE 4, the earth which is cut and scraped by the rearward blade will be worked upwardly into the defined bucket contemporaneously with the scraping operation. When the defined bucket is filled, the forward scraper blade may be pivoted downwardly to engage the rearward scraper blade, and the forward end of the frame may then be raised to a position such as shown by the solid lines in FIGURE 3. The tractor may then transport the loaded defined bucket to a remote position for dumping thereof. The defined bucket is dumped by pivoting the forward scraper blade upwardly toward a position such as shown by the dotted lines in FIGURE 3. It should be noted that the bucket need not be dumped completely at one position, but may be gradually dumped in an earth spreading operation.

Any of the previously described operations of the invention can be combined or varied to meet particular earth scraping problems.

Figure 2:
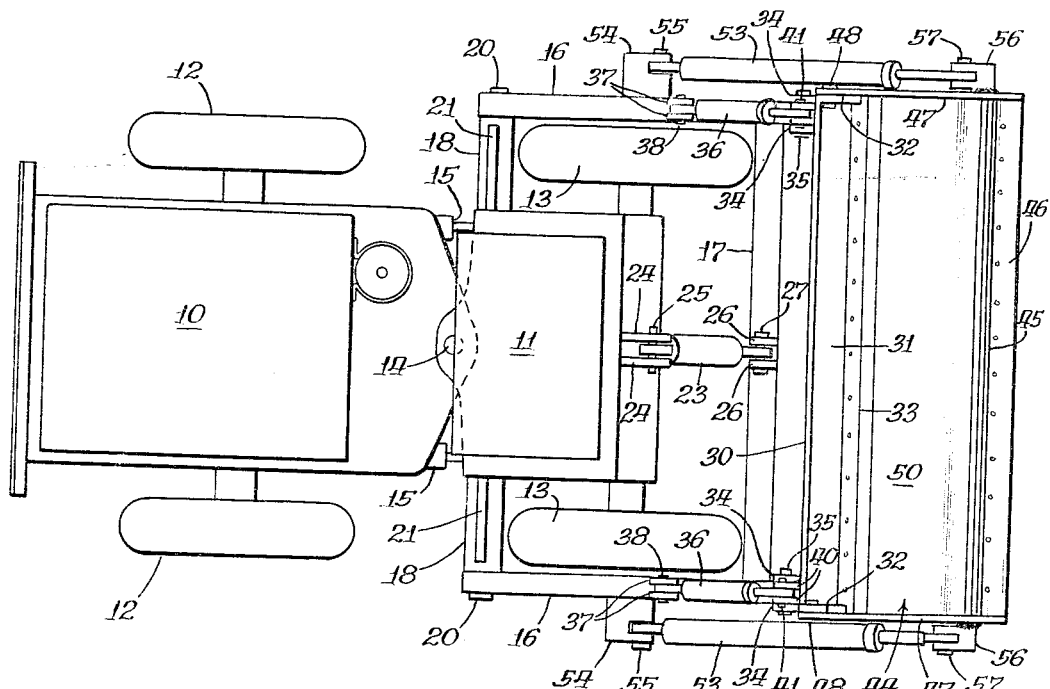
FIGURE 2 is a top plan view of the structure shown in FIGURE 1.

In detail, the tractor of the present embodiment comprises a rearward engine section 10 which is connected in an articulated arrangement to a forward operator's section 11. The rearward engine section 10 is carried on a pair of rear wheels 12, and the forward operator's section is carried on a pair of forward wheels 13. The rearward and forward tractor sections 10 and 11 are pivotally interconnected for pivotal movement relative to each other about a vertically disposed axis positioned between and substantially on the longitudinal center line of the tractor. The upper end of the pivotal means which interconnects the forward and rearward tractor sections 11 and 10 is shown in FIGURE 2 at 14. Hydraulic motor means 15 connected between the rearward and forward tractor sections 10 and 11 provides for steering of the tractor by adjusting the pivotal position between the rearward and forward tractor sections 10 and 11.

The frame for the scraper blade arrangement of the present invention comprises a pair of push beams 16 connected intermediate their ends to a cross piece 17. The rearward end of each push beam 16 is pivotally connected to a bracket 18 by pin means 20. Each bracket 18 is secured on one side of the forward tractor section 11 below the tractor frame, and is reinforced by a plate 21 which is welded between the bracket 18 and the forward tractor section 11. The brackets 18 and the pin means 20 carry the scraper frame so that the forward ends of the push beams extend forwardly of the tractor with the cross piece 17 extending transversely and forwardly of the tractor. The forward end of the scraper frame is raised and lowered by a hydraulic ram 23. The head end of the hydraulic ram 23 is pivotally connected between a pair of flanges 24 by a pin 25. The pair of flanges 24 is secured to the upper forward end of the forward tractor section 11 by any means such as welding. The rod end of the hydrauic ram 23 is pivotally connected between a pair of flanges 26 by a pin 27. The pair of flanges 26 is secured to the upper central portion of the cross piece 17.

A rearward scraper blade 30 is carried on forwardly extending portions of the push beams 16 of the scraper frame. The rearward scraper blade 30 comprises a reinforced moldboard 31 having side walls 32 integrally secured at each end thereof and a removable cutting edge 33 secured to the lower edge of the moldboard 31. A pair of flanges 34 is secured in a spaced apart relationship to each other on each rearward lower side of the rearward scraper blade 30. Each pair of flanges 34 is positioned with one flange thereof on each side of the forward end of one of the push beams 16 and is pivotally connected thereto by a pin 35. The pitch of the rearward scraper blade 30 is controlled by a pair of hydraulic rams 36. The head end of each hydraulic ram 36 is pivotally connected between a pair of flanges 37 by a pin 38. Each pair of flanges 37 is secured to the upper side of one of the push beams 16 intermediate the ends thereof. The rod end of each hydraulic ram 36 is pivotally connected between a pair of flanges 40 by a pin 41. Each pair of flanges 40 is secured to the rearward side of the rearward scraper blade 30 and at one upper side marginal edge thereof. From the foregoing description it may be seen that the rearward scraper blade 30 may be raised and lowered relative to the ground by appropriate extensions and retractions of the hydraulic ram 23, and that the pitch of the rearward scraper blade 30 may be adjusted by appropriate extensions and retractions of the pair of hydraulic rams 36 which will cause a pivoting of the rearward scraper blade 30 about the axis of pins 35.

The invention further comprises a forward scraper blade assembly 44. The forward scraper blade 44 comprises a moldboard 45 having a cutting edge 46 removably secured along the lower edge thereof, and a pair of side walls 47. The side walls 47 are secured at each end of the moldboard 45 by any means such as welding. The upper rearward corner of each side wall 47 is pivotally connected to the upper end of the rearward scraper blade 30 by a pin 48.

The forward scraper blade 44 further comprises a curved plate 50 and a flat plate 51. The curved plate 50 is carried between the side walls 47 and immediately rearwardly of the moldboard 45 and is secured thereto by any means such as welding. The curved plate 50 is further positioned to extend from the upper rearward end of the moldboard 45 in a downward and rearward direction to substantially the lower marginal edges of the side walls 47 at a position therealong which is spaced forwardly of the rearward edge of the side walls 47. The plate 51 is secured by any means such as welding between the lower marginal edges of the side walls 47 and between the lower rearward edge of the cutting edge 46 and the lower rearward edge of the curved plate 50. The side walls 47 of the forward scraper blade 44 are of such a height that when the rearward scraper blade 30 is in a normal scraping position and the lower marginal edges of the side walls 47 are substantially horizontal or inclined slightly upwardly and forwardly, the lower marginal edges of the side walls 47 are positioned substantially above the lower edge of the cutting edge 33 of the rearward scraper blade 30 so that a transverse opening is provided between the rearward marginal edge of the plate 51 and the cutting edge 33 of a size at least as great as the depth of cut of the cutting edge 33.

The pivotal position of the forward scraper blade 44 relative to the rearward scraper blade 30 is controlled by a pair of hydraulic rams 53. The head end of each of the hydraulic rams 53 is pivotally connected to a bracket 54 by a pin 55. Each of the brackets 54 is secured to one of the push beams 16 intermediate the ends thereof. The rod end of each hydraulic ram 53 is pivotally connected to a bracket 56 by a pin 57. Each of the brackets 56 is secured to one of the side walls 47 of the forward scraper blade 44 by any means such as welding. When the hydraulic rams 53 are substantially retracted such as shown in FIGURE 3, the rearward marginal edges of the plates 50 and 51 engage the surface of the cutting edge 33 of the rearward scraper blade 30 to define an open top container or bucket between the rearward scraper blade 30 and the forward scraper blade 44. When the hydraulic rams 53 are substantially extended to the dotted line position shown in FIGURE 3 the forward scraper blade 44 is positioned substantially above the rearward scraper blade 30.

Although not shown, it is intended that suitable hydraulic fluid pump, valve and conduit means be provided for selective operation of the various aforedescribed hydraulic rams under the control of the operator of the tractor.

In the operation of the invention it may be seen that both scraper blades 30 and 44 are raised and lowered responsive to retractions and extensions of the hydraulic ram 23, and the pitch of both scraper blades 30 and 44 is adjusted by operations of the hydraulic rams 36. Considering the operation of the invention shown in FIGURE 1, it may be seen that the rearward scraper blade 30 may be adjusted to a more shallow cut by a small retraction of the hydraulic rams 36. This adjustment of the rearward scraper blade 30 will cause some upward inclination of the plate 51. However, a slight retraction of the hydraulic rams 53 will again position the plate 51 substantially horizontally to provide an efficient stabilizing support for the rearward scraper blade 30 for the shallower cut of the rearward scraper blade 30. Conversely, if the hydraulic rams 36 are extended from the position shown in FIGURE 1 to cause the rearward scraper blade 30 to make a deeper cut, the hydraulic rams 53 may be extended from the positions shown in FIGURE 1 to again provide for substantially horizontal alignment of the support plate 51. When the invention is used in a scraping and bucket filling operation the hydraulic rams 23 is maintained in what is commonly called the float position. In other words the hydraulic ram 23 is adjusted to exert no holding forces on the scraper frame, and the weight of the scraper arrangement is distributed to the ground through the plate 51. As the tractor is moved forwardly the forward scraper blade 44 will slide along the surface of the ground as the cutting edge 33 of the rearward scraper blade cuts and directs a strip of earth into the bucket defined by the rearward and forward scraper blades 30 and 44. When the defined bucket is full, the hydraulic rams 53 may be retracted to close the lower end of the defined bucket, and the hydraulic ram 23 may be retracted to raise the scraper frame to a position such as shown in FIGURE 3. The earth which is then carried within the defined bucket may be transported to a remote location for dumping, or the load may be gradually spread while the tractor is moving by a partial extension of the hydraulic rams 53 to partially open the bottom of the defined bucket.

FIGURE 4 shows an adjusted position of the invention wherein the cutting edge 46 of the forward scraper blade 44 is positioned to cut and scrape the earth simultaneously with the cutting and scraping of the rearward scraper blade 30. The earth cut by the rearward scraper blade 30 will be directed into the defined bucket, while the earth scraped by the forward scraper blade 44 will be pushed and rolled in front of the forward scraper blade 44.

FIGURE 5 shows the use of the invention to pry out a large rock or boulder. As seen therein, the underside of the rearward scraper blade 30 is positioned to rest upon the ground, and the cutting edge 46 of the forward scraper blade 44 is hooked under one side of the rock. The hydraulic rams 53 are then extended to pivot the forward scraper blade 44 forwardly and upwardly to pry the rock from the ground. Substantially the entire reaction of the rock against the forward scraper blade 44 will be distributed to the ground through the underside of the rearward scraper blade 30.

The above described operations of the present invention are not intended to be all inclusive but are merely by way of example. The described operation may be varied and combined to meet the specific requirements of many other earth scraping problems.

Having described the invention what is considered new and desired to be protected by Letters Patent is:

1. In a tractor carried earth scraper arrangement, a scraper frame pivotally connected to said tractor and extending forwardly thereof, a rearward scraper blade pivotally connected to the forward end of said scraper frame, said rearward scraper blade having a cutting edge secured to the lower edge thereof, a forward scraper blade having a cutting edge secured to the lower forward edge thereof, means pivotally connecting said forward scraper blade to said rearward scraper blade, first adjusting means pivotally connected between said scraper frame and said rearward scraper blade for pivoting said rearward scraper blade and said forward scraper blade about the axis of pivoting said rearward scraper blade on said scraper frame, second adjusting means pivotally connected between said scraper frame and said forward scraper blade for pivoting said forward scraper blade relative to said rearward scraper blade about the axis of pivoting of said forward scraper blade on said rearward scraper blade, said rearward and forward scraper blades being further relatively pivotally connected so that said first and second adjusting means are operable to position the cutting edge of said forward scraper blade for cutting and scraping of earth at one level while the cutting edge of said rearward scraper blade contemporaneously cuts and scrapes earth at a second substantially deeper level.

2. In a tractor carried earth scraper arrangement, a scraper frame pivotally connected to said tractor and extending substantially horizontally forwardly thereof, a rearward scraper blade pivotally connected at the lower rearward side thereof to the forward end of said scraper frame, a forward scraper blade, pin means pivotally connecting said forward scraper blade at the upper rearward side thereof to the upper end of said rearward scraper blade, first adjusting means pivotally connected between said scraper frame and the upper rearward side of said rearward scraper blade for pivoting said rearward and forward scraper blades about the axis of pivoting of said rearward scraper blade on said scraper frame, second adjusting means pivotally connected between said scraper frame and said forward scraper blade for pivoting said forward scraper blade relative to said rearward scraper blade about the axis of pivoting of said forward scraper blade on said rearward scraper blade, said pin means further relatively pivotally connecting said rearward and forward scraper blades so that first and second adjusting means are operable to position said forward scraper blade for cutting and scraping of earth with said forward scraper blade at one level while said rearward scraper blade contemporaneously cuts and scrapes earth at a second substantially deeper level.

3. In a tractor carried earth scraper arrangement, a scraper frame pivotally connected to said tractor and extending substantially horizontally forwardly thereof, means pivotally connected between said tractor and said scraper frame for raising and lowering the forward end of said scraper frame, a rearward scraper blade pivotally connected at the lower rearward side thereof to the forward end of said scraper frame, pitch adjusting means pivotally connected between said scraper frame and the upper rearward side of said rearward scraper blade for pivoting said rearward scraper blade relative to said scraper frame, a forward scraper blade comprising side walls and bottom wall extending rearwardly thereof, pin means pivotally connecting said forward scraper blade at the upper rearward corners of said side walls thereof to the upper end of said rearward scraper blade, forward scraper blade adjusting means pivotally connected between said scraper frame and said side walls of said forward scraper blade for pivoting said forward scraper blade relative to said rearward scraper blade, said forward and rearward scraper blades defining an earth carrying bucket when the rearward edge of said bottom wall of said forward scraper blade engages said rearward scraper blade and a self-loading scraper is defined when said forward scraper blade is positioned with the rearward edge of said bottom wall spaced from said rearward scraper blade so that earth cut and scraped by the cutting edge of the rearward scraper blade is directed between said rearward scraper blade and said bottom wall into said defined bucket.

4. In a tractor carried earth scraper arrangement as defined in claim 3, wherein said bottom wall of said forward scraper blade is further formed to have a flat plate on the underside thereof, whereby when said pitch adjusting means and said forward scraper blade adjusting means are adjusted to place said flat plate in contact with the ground and to position said rearward scraper blade in an earth cutting and scraping position said flat plate will control the depth of cut of said rearward scraper blade.

5. In a tractor carried earth scraper, a scraper frame adapted to be pivotally connected to the tractor and extend forwardly thereof, a rearward scraper portion pivotally connected to said scraper frame, said rearward scraper portion including a rearward scraper blade, a forward scraper portion pivotally connected to said rearward scraper portion, said forward scraper portion including a forward moldboard and a forward scraper blade, and means for pivoting said scraper portions into a scraping position in which said forward scraper portion is above and spaced from said rearward scraper blade and said forward scraper blade is at the lowermost point of said forward scraper portion, whereby said forward scraper blade scrapes earth at one level while said rearward scraper blade contemporaneously scrapes earth at a substantially deeper level.

References Cited by the Examiner
UNITED STATES PATENTS 2,812,595  11/57  Drott _____ 37—117.5

BENJAMIN HERSH, *Primary Examiner.*

RICHARD A. DOUGLAS, CHARLES E. O'CONNELL,
*Examiners.*